(12) United States Patent
Virnig et al.

(10) Patent No.: US 6,261,526 B1
(45) Date of Patent: Jul. 17, 2001

(54) NICKEL RECOVERY PROCESS AND COMPOSITIONS FOR USE THEREIN

(75) Inventors: Michael J. Virnig; George Wolfe, both of Tucson, AZ (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/373,440

(22) Filed: Aug. 12, 1999

(51) Int. Cl.[7] ............................... C22B 23/00; C25C 1/06
(52) U.S. Cl. .................... 423/139; 423/140; 423/144; 423/150.1; 205/589
(58) Field of Search ................... 423/150.1, 140, 423/139, 144; 205/589

(56) References Cited

U.S. PATENT DOCUMENTS

| | | | |
|---|---|---|---|
| 3,224,873 | 12/1965 | Swanson | 75/101 |
| 4,020,105 | 4/1977 | Ackerley et al. | 260/566 |
| 4,020,106 | 4/1977 | Ackerley et al. | 260/566 |
| 4,085,146 | 4/1978 | Beswick | 260/600 |
| 4,173,616 | 11/1979 | Koenders et al. | 423/24 |
| 5,855,858 | * 1/1999 | Jones | 423/140 |
| 5,976,218 | * 11/1999 | Virnig et al. | 75/738 |

* cited by examiner

Primary Examiner—Steven Bos
(74) Attorney, Agent, or Firm—John E. Drach; Henry E. Millson, Jr.

(57) ABSTRACT

A process for the recovery of nickel from a nickel containing ore in which the ore, particularly a laterite ore, is initially leached with an aqueous acid solution, after which the nickel is precipitated as nickel hydroxide by adding a hydroxide to the aqueous acid leach solution containing the nickel, followed by a re-leaching of the nickel with an aqueous ammoniacal solution and recovery of the nickel by a solvent extraction of the nickel from the aqueous ammoniacal solution with an organic phase of a water insoluble oxime extractant comprising a ketoxime containing less than 10% phenols dissolved in a water-immiscible hydrocarbon solvent and the nickel recovered by electrowinning the nickel from the aqueous acid stripping solution employed to strip the nickel from the organic phase.

25 Claims, 2 Drawing Sheets

NICKEL RECOVERY PROCESS AND COMPOSITIONS FOR USE THEREIN

BACKGROUND OF THE INVENTION

1. Field of the Invention

This invention relates to the recovery of nickel from nickel ores.

2. Statement of Related Art

The extraction of nickel from nickel ores in which acid leach solutions are obtained from treatment of the ores with an acidic compound such as sulfuric acid is known. However, there is to date no simple effective solvent extraction process for the recovery of nickel from acid leach solutions such as acid leach sulfate solutions.

SUMMARY OF THE INVENTION

The present invention relates to an improved process for the extraction of nickel from nickel ores, especially nickel laterite ores; to improved reagents for the extraction of nickel values from aqueous ammoniacal leach solutions; and to an improved process for preparing ketoximes which are used alone or in combination with aldoximes as the extraction reagents. The use of the improved extractants of the invention in organic solvents for the extraction of nickel values from aqueous ammonium leach solutions results in less transfer of ammonia to the organic solvent extractant solution than is obtained with the use of organic solvent solutions of such extractants produced by known processes.

DESCRIPTION OF THE INVENTION

Figure 1:
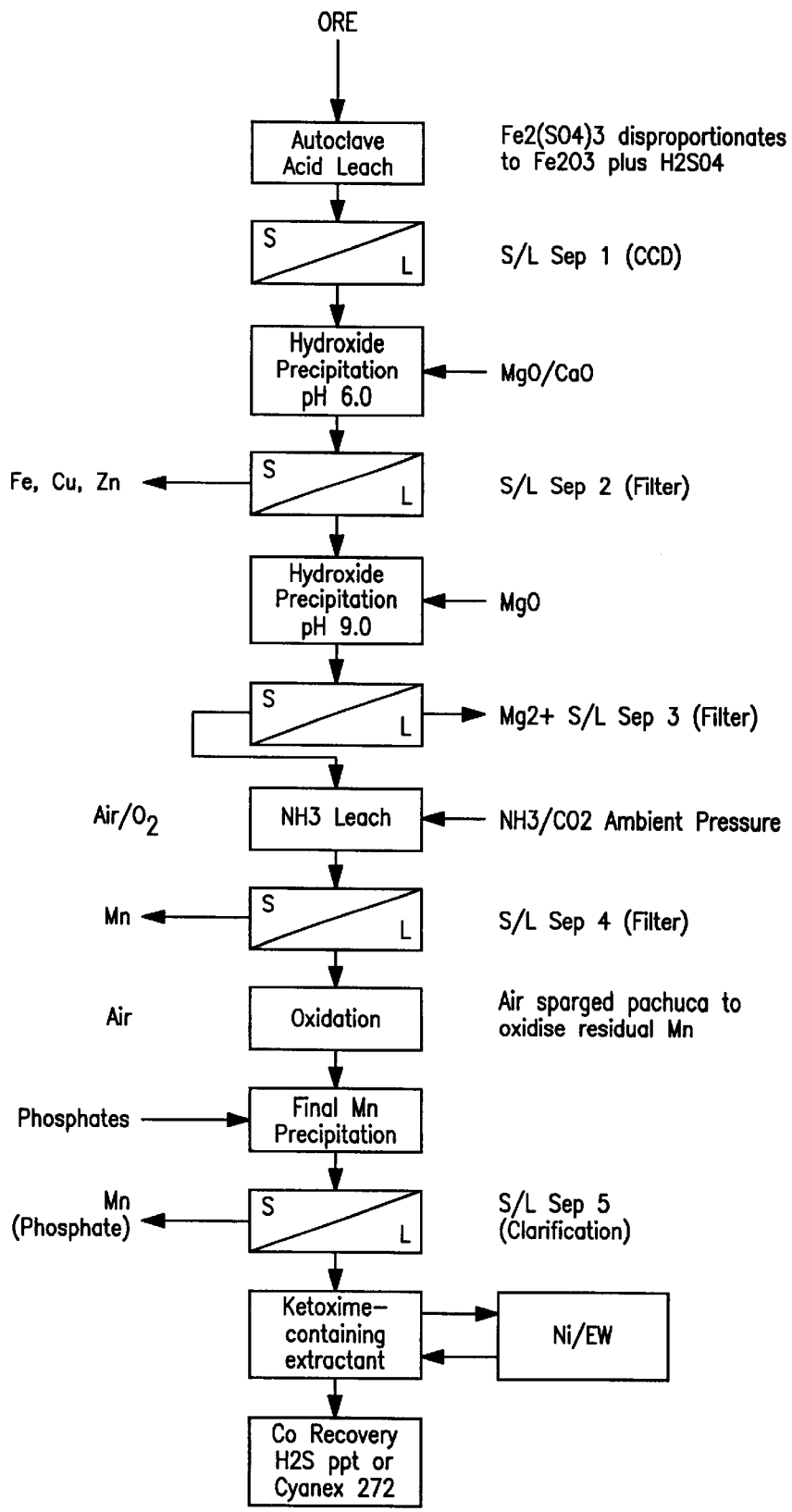
FIG. 1 is a diagrammatic representation of the general process of the present invention of a treatment of a laterite ore, initially with an acid leach, followed by removal of various other metals, and concluding with an extraction of an aqueous ammoniacal leach solution to remove the nickel, employing an oxime extractant, after which the nickel containing strip solution is processed by electrowinning to remove the nickel, while the raffinate containing Co is processed to remove Co by precipitation with $H_2S$.

In this description, except in the operating examples or where explicitly otherwise indicated, all numbers describing amounts of ingredients or reaction conditions are to be understood as modified by the word "about".

Briefly, the present invention has been found to be a technically and economically viable process for the recovery of nickel, particularly from laterite ores which contain a variety of other metals, which on acid leaching are leached from the ore non-selectively. This provides an acid leach liquor, which must be processed so as to remove the other metals which may cause problems in the recovery of the nickel by solvent extraction.

In its broadest terms, it has been discovered that when an ore such as laterite is leached with an acid, such as sulfuric acid, followed by precipitation of nickel hydroxide and re-leaching of the nickel in ammonia, the nickel can then be recovered by solvent extraction of the nickel using much improved water insoluble oxime extractants dissolved in a water immiscible solvent, such as a hydrocarbon solvent. Such a circuit overcomes many of the problems associated with direct solvent extraction of nickel from acid leach solutions using commercially proven solvent extraction processes. Accordingly in its broadest terms, the present invention is a process for the recovery of nickel from a nickel containing ore comprising:

(1) acid leaching of the ore to provide an acid leach liquor containing nickel along with other metal values;

(2) precipitating the nickel with a hydroxide to provide nickel hydroxide;

(3) re-leaching the nickel hydroxide with an aqueous ammoniacal leach solution providing an ammoniacal leach solution containing the nickel values;

(4) contacting the ammoniacal leach solution with an improved water insoluble oxime extractant dissolved in a water immiscible liquid solvent to extract nickel values from the aqueous ammoniacal leach solution to provide an organic phase now containing nickel values and an aqueous phase from which nickel values have been extracted;

(5) separating the organic phase containing nickel values from the aqueous phase;

(6) contacting the organic phase with an aqueous acid stripping solution to strip nickel values from the organic phase into the aqueous acid stripping solution;

(7) separating the aqueous acid stripping solution from the organic phase; and (8) recovering the nickel values from the aqueous acid stripping solution by electrowinning.

In the course of the process, other metals which may raise problems in the solvent extraction process are removed prior to the re-leaching of the nickel by the ammoniacal leach solution; such typical problem metals include:

(a) Manganese which under some conditions can form amine complexes and be potentially co-extracted with the nickel;

(b) Magnesium, which is present in laterite ores in significant quantities;

(c) Iron, which may be precipitated as iron oxides in some leach processes can be extracted by D2EHPA (di-2-ethylhexyl phosphoric acid), but is very difficult to strip;

(d) Rare earths, which are multivalent and extractable by reagents such as D2EHPA and tributylphosphate (TBP);

(e) Chromium;

(f) Copper/zinc, which are extractable by several reagents including D2EHPA and VERSATIC® acids (carboxylic acids), but are not usually present in laterite ores in economically attractive quantities.

Figure 2:
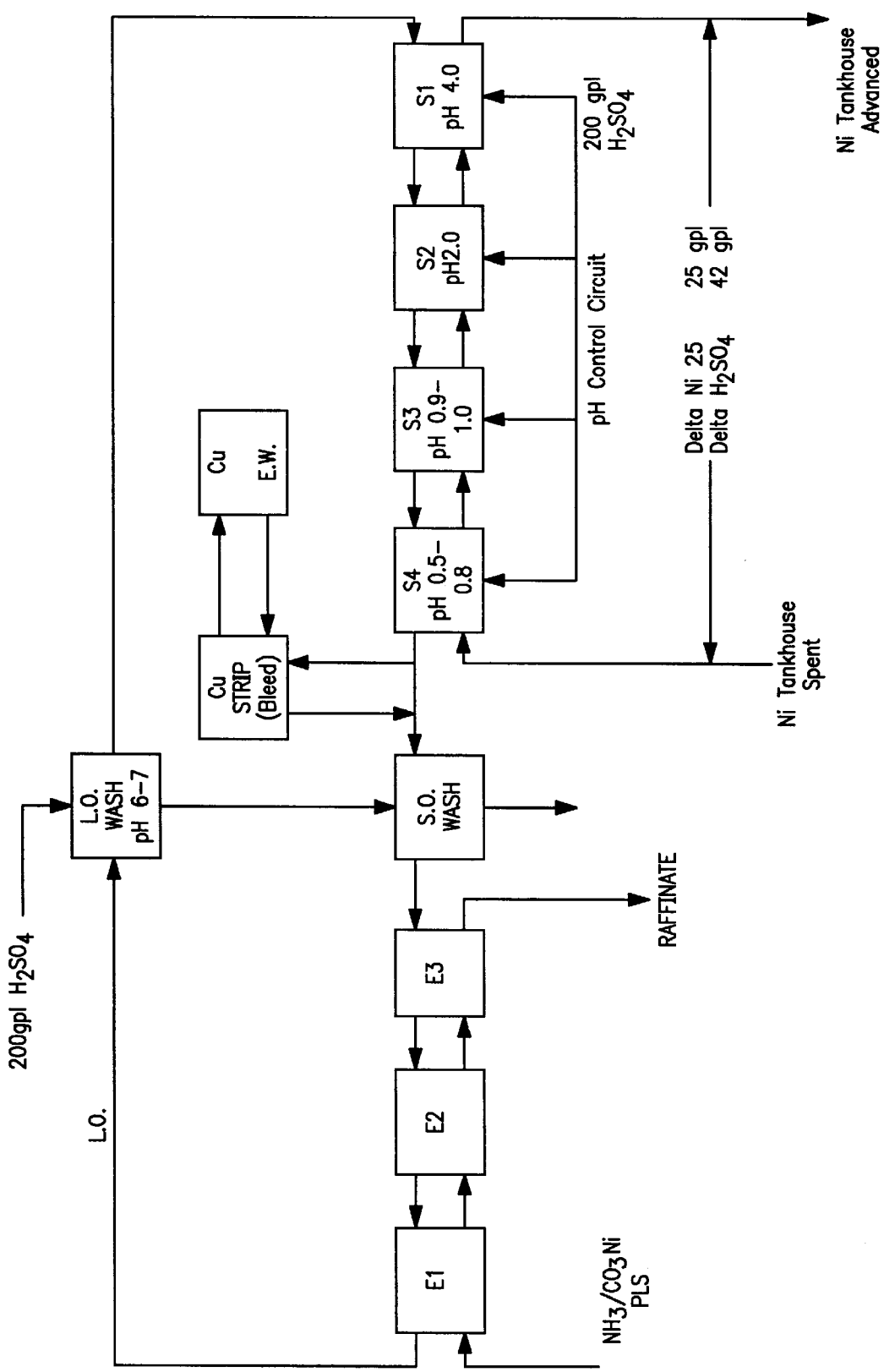
FIG. 2 is a diagrammatic representation of the concluding extraction stage of the aqueous ammoniacal solution containing the nickel, utilizing three extraction stages and 4 strip stages.

The overall process and the extraction from aqueous ammoniacal leach solutions can be seen by reference to FIGS. 1 and 2. As can be seen from FIG. 1, the laterite ore is first leached with an acid leach and the solids separated from the liquid leach solution, shown as L/L Sep. 1.

The next step is the hydroxide precipitation at a more basic pH, e.g. a pH of 6.0, preferably using a hydroxide such as $Ca(OH)_2$, $Mg(OH)_2$, and the like, or a basic compound that forms a hydroxide in aqueous solution, such as MgO and CaO. A second solid (S)/liquid(L) separation takes place here designated as S/L Sep 2 (filter) in which the Fe, Cu, and Zn are removed, as shown in the Figure.

Another hydroxide precipitation can then be undertaken at a pH of 9.0 using MgO followed by another S/L separation designated as S/L Sep 3 (Filter) in which Mg (2) plus others are removed.

The nickel is then leached by an aqueous ammoniacal carbonate or sulfate leach solution at ambient pressure shown as NH3/CO2 with air or oxygen also employed.

The aqueous ammoniacal leaching is followed by another S/L Sep 4 (Filter) to remove Mn, as shown.

A further oxidation may be conducted using an air sparge to oxidize any residual Mn which is then precipitated by the use of a phosphate, and the Mn phosphate is then removed by a final S/L separation designated as S/L Sep 5.

The aqueous ammoniacal leach solution now containing the nickel and some residual cobalt is then contacted with the improved oxime extractant dissolved in a water immiscible hydrocarbon solvent as discussed above to extract the nickel values. The organic phase is separated and contacted with an aqueous acid solution to strip the nickel values therefrom. The nickel value-containing aqueous solution proceeds to the electrowinning step and the ammoniacal leach solution raffinate containing cobalt proceeds to cobalt recovery by treatment with hydrogen sulfide to precipitate the cobalt, or by the use of another conventional Co recovery process.

The aqueous ammoniacal extraction can best be seen from FIG. 2, which is shown using three extraction mixer-settler stages E1 through E3 and four mixer-settler stripping stages with pH control shown as S1 through S4. As can be seen, the flow is countercurrent in the process. Thus, in the typical three stage extraction system, the feedstock will flow through an initial mixer-settler stage (E1), subsequently through a second stage (E2) and then through a final mixer-settler stage (E3). The organic phase will in turn initially contact the feedstock in E3, encounter a second contact in E2 and then through a final contact in E1.

After extraction the depleted aqueous feedstock (raffinate) is either discharged or recirculated for further leaching. The loaded organic (LO) phase containing the dissolved nickel extractant complex may be washed at a pH of 6–7 to prevent transfer of ammonia to the stripping stages and then fed to another set of mixer-settlers where it is mixed with an aqueous strip solution containing sulfuric acid. The highly acidic strip solution breaks apart the extractant complex and permits the purified and concentrated nickel complex to pass to the strip aqueous phase. As in the extraction process described above, the mixture is fed to another mixer-settler tank for phase separation. The process of breaking the nickel extractant complex is called the stripping stage and the stripping operation is repeated through several stages (in FIG. 2 four stripping stages (S1 through S4)) to more completely strip the nickel from the organic phase. Where there is sufficient copper present, a copper strip or "bleed" stream may be employed as shown in FIG. 2 in which the copper may also be recovered in a separate electrowinning step, as shown in the Figure. As with the extraction stages, there is a countercurrent flow in the strip stages, as shown in the Figure. From the stripping settler tank, the regenerated stripped organic (SO) is recycled to the extraction mixers optionally after washing of the SO. The stripped aqueous phase containing the nickel is fed to an electrowinning tankhouse, where the nickel metal values are deposited on plates by an electrodeposition process (electrowinning), as shown. The spent electrolyte is returned as shown to the stripping stages i. e. S4, to begin stripping again.

For the ammoniacal leach solution, the feed solution for the extraction preferably contains less than 100 g/l $NH_3$, more desirably less than 70 g/l and most preferably less than about 40 g/l.

The reagents for use in the practice of the process for the extraction of nickel in step (4) are ketoximes of the formulae:

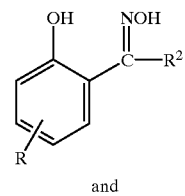

(I)

and

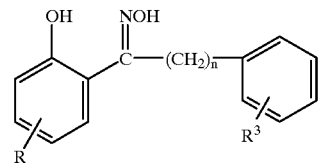

(II)

wherein in formula I, R is an alkyl group having from 1 to 25 carbon atoms, an ethylenically unsaturated aliphatic group containing from 3 to 25 carbon atoms, or $—OR^1$ where $R^1$ is an alkyl group or ethylenically unsaturated aliphatic group as defined above; $R^2$ is an alkyl group containing 1 to 25 carbon atoms or an ethylenically unsaturated aliphatic group containing 3 to 25 carbon atoms; with the proviso that the total number of carbon atoms in the R and $R^2$ groups is from 3 to 25; and wherein in formula II, R has the same meaning as in formula I; n is 0 or 1; and $R^3$ is an alkyl group having from 1 to 25 carbon atoms, an ethylenically unsaturated aliphatic group containing from 3 to 25 carbon atoms or $—OR^1$ wherein $R^1$ is an alkyl group or ethylenically unsaturated aliphatic group as defined above; with the proviso that the total number of carbon atoms in the R and $R^3$ groups is from 3 to 25; and wherein the above ketoximes contain less than 10%, usually less than 8%, often less the 6%, and even less than 3% by weight of unreacted phenols.

One embodiment of the improved process for the preparation of the above ketoximes used in the practice of the invention comprises the following steps:

A) heating a least one phenol ester of the formula:

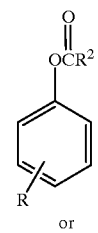

(III)

or

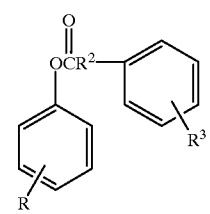

(IV)

wherein R, $R^2$, $R^3$ and n have the meanings given above, wherein the above phenol enters contain unreacted phenols, in an inert organic solvent with a Lewis acid and a monocarboxylic acid halide (preferably chlorine or bromine) or anhydride to obtain a ketone by the Fries Rearrangement;

B) isolating the ketone reaction product from the reaction mixture; and

C) reacting hydroxylamine or a salt thereof with the ketone obtained in step B) to produce a ketoxime from said ketone.

The above phenol esters can be readily obtained from the corresponding phenols by methods well known to the art.

The organic solvent is any organic solvent or mixture of solvents which is immiscible with water and inert to the water, to the Lewis acid catalyst, and to the monocarboxylic acid halide or anhydride, e.g. aliphatic and aromatic hydrocarbons, chlorinated hydrocarbons, esters and ethers. Toluene is preferred.

The Lewis acid is preferably aluminum chloride, although other Lewis acids can also be used, such as boron trifluoride. The quantity of Lewis acid can range from 0.9 to 1.5 moles per mole of phenol ester.

While various monocarboxylic acid halides and anhydrides can be used in the present process, the monocarboxylic acid halide or anhydride is preferably selected from compounds of formula V or VI below:

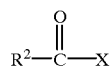
(V)

where $R^2$ an alkyl group containing 1 to 25 carbon atoms or an ethylenically unsaturated aliphatic group containing 3 to 25 carbon atoms, with the proviso that the total number of carbon atoms in the R group in formula III plus the $R^2$ group in formula V is from 3 to 25; and x is halogen or

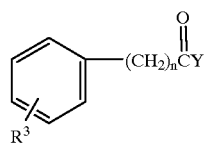
(VI)

where $R^3$ is an alkyl group having from 1 to 25 carbon atoms, an ethylenically unsaturated aliphatic group containing from 3 to 25 carbon atoms, or —$OR^1$ where $R^1$ is an alkyl group or ethylenically unsaturated aliphatic group as defined above; n is 0 or 1; and y is halogen or

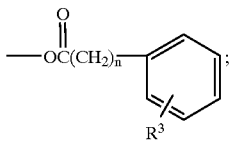

with the proviso that the total number of carbon atoms in the R group in formula IV plus the $R^3$ group in formula VI is from 3 to 25 carbon atoms.

The $R^2$ or $R^3$ groups in the monocarboxylic acid halide or anhydride can be the same as the $R^2$ or $R^3$ groups in the esters of formulae III and IV, or can be different therefrom, but are preferably the same.

The reaction temperature in step A) can range from 50° to 150° C., preferably from 100° to 125° C., and more preferably at the reflux temperature of the mixture.

The mixture is preferably heated for a time period in the range of from 2 to 6 hours.

It is also preferred to add the Lewis acid and monocarboxylic acid halide or anhydride by slow addition during the entire reaction period or during al least a major portion thereof.

It is also preferred to maintain the reaction mixture at the reaction temperature for an additional period (holding period) of from 1 to 4 hours.

For every mole of phenol ester, from 0.5 to 2 moles, preferably from 0.9 to 1.1 moles of Lewis acid is present, and from 0.1 to 1 mole, preferably from 0.2 to 0.6 moles of monocarboxylic acid halide or anhydride is present. The above ranges are however not critical and quantities of components outside these ranges can be employed.

Step B) can be carried out in any convenient manner such as by washing the reaction mixture with water to remove the Lewis acid and then distilling off the inert organic solvent, followed by distillation to obtain a substantially pure ketone.

Step C) is carried out by heating the mixture to a temperature between 20° and 90° until the reaction is substantially complete.

The hydroxylamine or salt thereof is added in approximately molar proportions based on the quantity of ketone reaction product isolated in step B).

Hydroxylamine itself or a salt thereof such as the sulfate salt, can be used in step C).

The reaction in step C) is preferably carried out in a solvent such as aqueous ethanol or toluene. When a salt of hydroxylamine is used, a base such as sodium carbonate or sodium or potassium hydroxide is added in a quantity sufficient to liberate hydroxylamine.

When the reaction is completed, usually after a few hours, the reaction mixture is neutralized if needed with a mineral acid, and the ketoxime product extracted with a water-immiscible solvent, e.g. chloroform, toluene, or kerosene, or if a solid, collected by filtration.

A second embodiment of the process of the invention for the preparation of the above ketoximes used in the practice of the invention comprises the following steps:

A) reacting a phenol with a monocarboxylic acid, acid halide, or acid anhydride in an inert organic solvent in the presence of an acid catalyst to esterify the phenol;

B) removing any water of reaction either during step A or in a separate step following step A);

C) adding a Lewis acid to the resulting anhydrous reaction mixture;

D) reacting the reaction mixture from step C) to a reaction temperature and for a time to convert most of the esterified phenol to a ketone by the Fries Rearrangement;

E) maintaining the reaction for an additional time period of from 2 to 10 hours at the reaction temperature:

F) at a time of from half to three-quarters of said additional time period adding to the heated reaction mixture additional aliphatic monocarboxylic acid, acid halide or acid anhydride, optionally with additional Lewis acid, and continuing to maintain the heated reaction mixture at the reaction temperature for the remainder of said additional time period;

G) isolating the ketone reaction product from the reaction mixture; and

H) reacting hydroxylamine or a salt thereof with the ketone obtained in step G) to produce a ketoxime from said ketone.

In step A) the phenol has the formula:

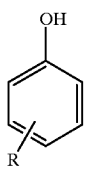
(VII)

where R has the meaning given above.

The monocarboxylic acid, acid halide, or acid anhydride is selected from a compound of formula VIII or formula IX below:

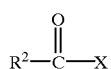
(VIII)

where $R^2$ is an alkyl group containing 1 to 25 carbon atoms or an ethylenically unsaturated aliphatic group containing 3 to 25 carbon atoms, with the proviso that the total number of carbon atoms in the R group in formula VII plus the $R^2$ group in formula VIII is from 3 to 25; and x is —OH, halogen (preferably chlorine or bromine) or

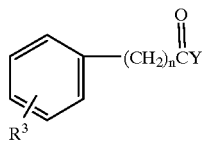
(IX)

where $R^3$ is an alkyl group having from 1 to 25 carbon atoms, an ethylenically unsaturated aliphatic group containing from 3 to 25 carbon atoms, or —$OR^1$ where $R^1$ is an alkyl group or ethylenically unsaturated aliphatic group as defined above; n is 0 or 1; and y is OH, halogen (preferably chlorine or bromine), or

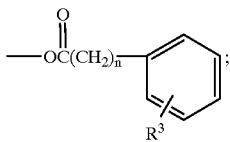

with the proviso that the total number of carbon atoms in the R group in formula VII plus the $R^3$ group in formula IX is from 3 to 25.

The organic solvent is any organic solvent or mixture of solvents which is immiscible with water and inert to the water, to the acid catalyst, to the phenol, and to the monocarboxylic acid, acid halide, or acid anhydride, e.g. aliphatic and aromatic hydrocarbons, chlorinated hydrocarbons, esters, and ethers, Toluene is preferred.

The acid catalyst is preferably a sulfonic acid, e.g. methane or p-toluene sulfonic acid. However, other acid catalysts can be used such as a mineral acid, e.g. sulfuric acid, hydrochloric acid and the like. The catalyst can be present in from 0.1 to 5% by weight, based on the weight of the reactants.

Step A) can be carried out at a temperature of from 30° C. to the boiling point of the organic solvent. Where an organic solvent is used which will azeotrope water, any water of reaction present can be removed as formed. Water of reaction will form when a monocarboxylic acid is used as a reactant.

Preferably, approximately equimolar quantities of reactants are used in step A).

Step B), if needed, can be carried out by heating the reaction mixture until any water present has distilled off.

In step C) the Lewis acid is preferably aluminum chloride, although other Lewis acids can also be used, such as boron trifluoride. The quantity of Lewis acid can range from 0.9 to 1.5 moles per mole of ester formed in step A).

In step D) the reaction temperature can range from 30° C. to 150° C., preferably from 50° to 125° C., and more preferably at the reflux temperature of the mixture.

In step F) the additional monocarboxylic acid or derivative thereof and optional Lewis acid is added when the additional time period is from one half to three-quarters over, e.g. if the additional time period used is 4 hours, then the addition is made during the period of from 2 to 3 hours.

The quantity of additional monocarboxylic acid or derivative thereof can range from 10% to 50% by weight of the quantity present in step A). The quantity of additional Lewis acid, if also added, can range from 1% to 10% of the quantity present in step A).

Steps G) and H) are carried out in the same manner as steps B) and C) in the first embodiment.

A third embodiment of the improved process for the preparation of the above ketoximes used in the practice of the invention comprises the steps of:

A) reacting a phenol with a monocarboxylic acid halide or anhydride in an inert organic solvent in the presence of a Lewis acid (preferably $AlCl_3$ or $BF_3$) at a temperature and for a time sufficient to esterify the phenol and rearrange the esterified phenol to a ketone;

B) maintaining the heated reaction mixture for an additional time period of from 2 to 10 hours at the reaction temperature;

C) at a time of from half to three-quarters of said additional time period, adding to the heated reaction mixture additional aliphatic monocarboxylic acid or acid halide, optionally with additional Lewis acid, and continuing to maintain the heated reaction mixture at the reaction temperature for the remainder of said additional time period;

D) isolating the ketone reaction product from the reaction mixture; and

E) reacting hydroxylamine or a salt thereof with the ketone obtained in step D) to produce a ketoxime from said ketone.

In the above reaction sequence, the phenol, monocarboxylic acid halide or anhydride and the inert organic solvent are the same as those used in the second process embodiment. Also steps C) through E) are carried out in the same manner as steps F) through H) of the second embodiment.

The reaction temperature in step A) is from 20° C. to 90° C.

The ketone intermediate products produced by the above process embodiments have the following formulae:

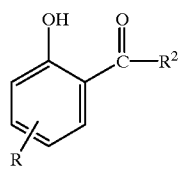

(X)

wherein R and R² have the meanings given above, or

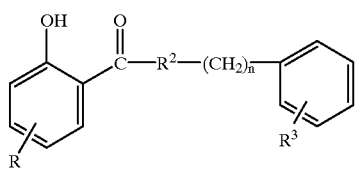

(XI)

wherein R, R³ and n have the meanings given above.

The ketoximes obtained in step C) of the first embodiment, step H) of the second embodiment, and step E) of the third embodiment are the oximes obtained from the above ketones, i.e. ketoximes of formula I and II above.

The ketones obtained from prior known processes contain a relatively large quantity of unreached phenols used as starting materials in the preparation of the phenol esters. These unreacted phenols are extremely difficult to separate from the ketone product. Prior processes produce ketones containing 10% by weight or more of unreacted phenols.

The present process results in ketone intermediates containing less than 10%, usually less than 8%, often less than 6%, and even less than 3% by weight of unreacted phenols.

Moreover, the ketoxime products resulting from the oximation of the ketones similarly contain less than 10%, usually less than 8%, often less than 6%, and even less than 3% by weight of unreacted phenols. Hence, the ketoxime products obtained by the processes of the invention have a significantly higher degree of purity than those produced by prior art processes.

In addition, the product yields of ketones and ketoximes are significantly higher than yields obtained by known processes, e.g. a 10% higher yield, since a significant portion of unreacted phenols in the phenol ester starting material is converted to the desired ketone product.

This invention also relates to reagent compositions useful in the extraction of nickel from nickel ores, comprising at least one ketoxime of the invention and optionally at least one aldoxime. In addition, one or more of ammonia antagonists, kinetic active substances, and liquid diluents can also optionally be present.

Preferred ketoximes for use in the present compositions are those of formula I above having an isomeric mixture of 7 to 12 carbon alkyl groups as a single substituent on the ring para to the hydroxyl group. Also preferred are compounds wherein the R² alkyl group is methyl. Consequently illustrative of preferred phenyl alkyl ketone oxime compounds is 2-hydroxy-5-nonyl phenyl methyl ketone oxime.

Also preferred are benzophenone oxime compounds of Formula II having a single alkyl ring substituent having from 7 to 12 carbon atoms in a position para to the hydroxyl group, which alkyl substituent is a mixture of isomers. Examples of such compounds are 2-hydroxyl-5-nonyl benzophenone oxime and 2-hydroxy-5-dodecyl benzophenone oxime which are obtained as mixtures of alkyl isomeric forms when commercial nonylphenol and dodecyl phenol are respectively employed in their synthesis. Preferred phenyl benzyl ketone oximes of formula II like the above-noted benzophenone oximes, are those having an isomeric mixture of 7 to 12 carbon alkyl groups as a single substituent on the ring para to the hydroxyl group. These preferred compounds are exemplified by the compound, 2-hydroxy-5-nonylphenyl benzyl ketone oxime, as manufactured from a commercial nonylphenol comprising a mixture of nonyl isomeric forms.

The aldoximes useful in the present compositions are those of formula XII below:

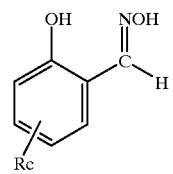

(XII)

in which R is as defined above with respect to Formulas I and II, c has a value of 1, 2, 3 or 4, and the total number of carbon atoms in $R_c$ is from 3 to 25. Preferred compounds of Formula XII are those wherein c is 1, R is a straight or branched chain alkyl group having from 7 to 12 carbon atoms, and wherein R is attached in a position para to the hydroxyl group. Among these, the more preferred are those wherein R is a mixture of Isomers.

Compounds of Formula XII (i.e., hydroxy benzaldoxime compounds, sometimes referred to as "salicylaldoximes") may suitably be prepared according to the methods described in Ackerley, et al., U.S. Pat. No. 4,020,105 or Ackerley, et al., U.S. Pat. No. 4,020,106 or by oximation of aldehydes prepared according to Beswick, U.S. Pat. No. 4,085,146. The above patents are incorporated herein by reference. Again, preferred compounds are those having an isomeric mixture of 7 to 12 carbon alkyl groups as a single substituent para to the hydroxyl group. Mixed alkyl isomeric forms of 2-hydroxy-5-heptyl benzaldoxime, 2-hydroxy-5-octyl benzaldoxime, 2-hydroxy-5-nonyl benzaldoxime and 2-hydroxy-5-dodecyl benzaldoxime are thus preferred.

Compositions of the invention comprise mixtures of one or more ketoximes of Formulas I and II with one or more aldoximes of Formula XII in molar ratios ranging from 1:100 to 100:1 and preferably from 1:4 to 4:1 with good results begin obtained at ratios of 1:1.

In step (4) above in the process for the recovery of nickel from a nickel ore, this step using commercially available ketoximes results in significant amounts of ammonia being transferred from the ammoniacal leach solution to the hydrocarbon solvent/oxime extractant (organic phase). The ammonia must then be removed from the organic phase, at a cost of ammonia lost to the system and a cost of acid required to neutralize the ammonia in step (6) of the process.

It has now been discovered that the ketoximes of the invention, when used alone or in combination with aldoximes in step (4), results in significantly less transfer of ammonia from the leach solution compared to commercially available ketoximes or ketoxime/aldoxime combinations.

Ammonia antagonist compounds, which can optionally be present with the oxime extractants of the invention, and which may also function as an equilibrium modifier, acts to provide an efficient net transfer of the metal values in the overall extraction process, particularly, where the extractant is a strong extractant such as a ketoxime/aldoxime extractant for the metal, a significant reduction in the chemically bonded ammonia results, thereby providing reduced cost of operation, minimizing, if not eliminating, the scrubbing of the organic phase with a weakly acidic solution. Thus, the ammonia antagonist is employed in an amount effective to provide a significant reduction in the ammonia in the organic phase when employed in an effective amount with the present ketoxime or ketoxime/aldoxime extractant. The ammonia antagonist is a compound which may be characterized as a pure hydrogen bond acceptor compound. By "pure hydrogen bond acceptor" is meant that the compound is "only" a hydrogen bond acceptor compound in contrast to compounds which are hydrogen bond donors or a mixed hydrogen bond donor and acceptor. Mixed hydrogen bond donor and acceptor compounds can be illustrated by alkyl phenols, such as nonyl phenol or alcohols such as tridecanol, each of which is a mixed hydrogen bond donor and acceptor. While the ammonia antagonist is useful with ketoxime/aldoxime strong extractants, in that they may also act as an equilibrium modifier to provide efficient net transfer, the ammonia antagonist is also useful with the weaker oxime extractant, such as the ketoxime extractant in that a very significant reduction in ammonia transfer to the organic phase occurs, though equilibrium modifier properties may not be necessary in the case of the ketoxime extractants. Thus, in the improved process of the present invention, there can be employed ammonia antagonist compounds which are "non-hydrogen bond donating" and are only "hydrogen bond accepting" compounds.

It was found that the use of an ammonia antagonist, which is only a hydrogen bond acceptor modifier, such as 2,2,4-trimethylpentane-1,3-diol diisobutyrate, surprisingly resulted in about a 50% reduction in the amount of ammonia transferred relative to the Ni.

The ammonia antagonists for use in the present nickel extraction process are those organic hydrogen bond acceptor compounds containing one or more of the following organic functionalities: ester, ketone, sulfoxide, sulfone, ether, amine oxide, tertiary amide, phosphate, carbonate, carbamate, urea, phosphine oxide, and nitrile and having greater than 8 carbon atoms, up to about 36 carbon and a water solubility of less than 100 ppm, more desirably less than 50 ppm and preferably less than 20 ppm. Other than 2,2,4-trimethylpentane-1,3-diol diisobutyrate, which is preferred, illustrative ammonia antagonists which are only hydrogen bond acceptor compounds are: alkyl esters and dialkyl ketones in which the alkyl groups contain from 4 to about 12 carbon atoms, such as isobutyl isooctanoate and isobutyl heptyl ketone and the dinitrile of dimerized fatty acids such as dimerized $C_{18}$ fatty acids, (Dimer Acid™ dinitrile).

For the original aqueous ammoniacal feed or leach solution for the extraction, the solution preferably contains less than about 100 g/l ammonia, more desirably less than 70 g/l and preferably less than about 40 g/l $NH_3$.

The stripping solution for removing the metal values from the organic phase in step (6) above is a highly acidic aqueous solution, such as an aqueous sulfuric acid solution containing above 5 g/l sulfuric acid up to about 200 g/l dependent on the particular metal to be recovered and being suitable for recovery of the metal by electrowinning, the preferred means for recovering the metal from the stripping solution.

Prior to stripping as noted in step (6) above, the organic phase can be washed or scrubbed with a weakly acidic aqueous solution, such as a sulfuric acid solution at a pH of about 3 to about 6, typically about 4 to 5, and by one or more water washes, depending on any trace metals present and the required acidity of the nickel loaded stripping solution.

In step (4) the water immiscible liquid solvent used to form the organic phases containing the water insoluble oxime extractant of the invention include aliphatic and aromatic hydrocarbons such as kerosene, benzene, toluene, xylene and the like. A choice of essentially water-immiscible hydrocarbon solvents or mixtures thereof will depend on factors, including the plant design of the solvent extraction plant, (mixer-settler units, extractors) and the like. The preferred solvents for use in the present invention are the aliphatic or aromatic hydrocarbons having flash points of 130° Fahrenheit and higher, preferably at least 150° and solubilities in water of less than 0.1% by weight. The solvents are essentially chemically inert. Representative commercially available solvents are Chevron™ ion exchange solvent (available from standard Oil of California) having a flash point of 195° Fahrenheit; Escaid™ 100 and 110 (available from Exxon-Europe) having a flash point of 180° Fahrenheit; Norpar™ 12 (available from Exxon-USA) with a flash point of 160° Fahrenheit; Conoco™ C1214 (available from Conoco) with a flash point of 160° Fahrenheit; and Aromatic 150 (an aromatic kerosene available from Exxon-USA having a flash point of 150° Fahrenheit), and other various kerosenes and petroleum fractions available from other oil companies.

In the present process, the volume ratios of organic to aqueous (O:A) phase will vary widely since the contacting of any quantity of the oxime organic solution with the nickel containing aqueous ammoniacal solution will result in the extraction of nickel values into the organic phase. For commercial practicality however, the organic (O) to aqueous (A) phase ratios for extraction are preferably in the range of about 50:1 to 1:50. It is desirable to maintain an effective O:A ratio of about 1:1 in the mixer unit by recycle of one of the streams. In the stripping step (6) the organic:aqueous stripping medium phase will preferably be in the range of about 1:4 to 20:1. For practical purposes, the extracting and striping are normally conducted at ambient temperatures and pressure although higher and lower temperatures and pressures are entirely operable. It is preferable to strip at elevated temperatures. While the entire operation can be carried out as a batch operation, most advantageously the process is carried out continuously with the various streams or solutions being recycled to the various operations in the process for recovery of the nickel, including the leaching, extraction and the stripping steps.

In the extraction process, the organic solvent solutions may contain the oxime extractant typically in an amount of about 2 to 15 weight/volume %.

After stripping of the metal values from the organic phase by the aqueous stripping solution and separation of the organic and aqueous stripping phase, the metal is recovered by a conventional electrowinning recovery process. Electrowinning is typically the preferred means of recovery of the metal from solutions suitable for electrowinning, generally highly acidic aqueous solutions, such as a sulfuric acid solution containing greater than about 5 to about 200 g/l sulfuric acid, which is preferred as the aqueous acidic stripping solution to remove the metal values from the organic phase.

As noted earlier, the organic phase can be washed or scrubbed prior to stripping, with a weakly acidic aqueous solution. The purpose of this is to neutralize any entrained ammonia which might be carried over to, and contaminate, the highly acidic stripping solution and potentially interfering with the electrowinning of the metal from the stripping solution.

Kinetic additive substances may be present in the organic phase in amounts ranging from 0 to 20 mole percent based on ketoxime content and preferably from 0 to 5 mole percent. If present at all, as little as 0.01 mole percent may be used. Preferred kinetic additives include alpha hydroxy oximes described in Swanson, U.S. Pat. No. 3,224,873 and alpha, beta dioximes described in Koenders, et al., U.S. Pat. No. 4,173,616. The above patents are incorporated herein by reference. A preferred α-hydroxy oxime kinetic additive is 5,8-diethlyl-7-hydroxydodecan-5-oxime and a preferred dioxime kinetic additive is a mixture of 1-(4'-alkylpheny)-1,2-propanedione dioximes according to Example 3 of U.S. Pat. No. 4,173,616.

The liquid diluents that can optionally be present in the oxime reagents of the invention are the same as the water immiscible liquid hydrocarbon solvents used in step (4).

The present invention as illustrated in FIGS. 1 and 2 provides many advantages over the methods or processes employed prior hereto. These include:

1. Impurities which can cause problems in solvent extraction such as manganese, do not report to the solvent extraction circuit as they are either rejected as hydroxides or as unprecipitated sulfates in the solid-liquid (S/L) separations steps.
2. Magnesium is present in the acid leach solution as magnesium sulfate and will be rejected prior to nickel solvent extraction.
3. The base metal hydroxides can be stored and fed at a uniform rate to the ammonia leach solvent extraction circuit much easier than would be the case if a direct laterite leach nickel solvent extraction process was used.
4. The ammonia leaching of the base metal hydroxide acts as a preconcentration stage and the nickel concentration produced by the ammonia leach solution can be in the range of 10–50 g/l.
5. Stockpiling of the base metal hydroxides makes possible the feeding of a constant tonnage of nickel to the solvent extraction circuits. This enables the solvent extraction plant to operate with a constant organic flow rate at a constant nickel loading in g/l. The latter is important as the strip circuit must be run so as to deliver an advance electrolyte of pH 4.0. If the loaded organic flow to the strip circuit were to decrease in volume or in nickel loading, then at a constant nickel electrowinning rate there would be excess acid in the spent electrolyte and consequently the pH of the advance electrolyte would fall with adverse consequences for the electrowinning circuit.
6. The markedly diminished transfer of ammonia to the organic phase in step (4) as discussed earlier.

The invention will be illustrated but not limited by the following examples.

EXAMPLES

Example 1

438 g. nonlyphenol acetate and 428 g. toluene were fed to a 1 l. stirred reactor, heated to reflux (115° C.) and dried by decantation of the water from the condensate. Then 220 g. of granulated AlCl₃ was charged to the refluxing mixture over a period of 5 hours. At the same time 30 g. of acetyl chloride was continually introduced into the reaction mixture below the surface. When the AlCl₃ and acetyl chloride addition was finished, a 3 hour reaction hold time followed at the same reaction temperature. At the end of the reaction hold time the product mixture was transferred to a second reactor filled with 900 g. water at normal temperature and stirred for 15 minutes. The temperature rose to 70–80° C. The stirrer was stopped and after settling the water layer was drained off. A second wash (70–75° C.) was added consisting of 21.38 g. of sodium carbonate dissolved in 833.62 g. of water (i.e. a 2.5% carbonate solution) was added, agitated for 15 minutes, settled for 15 minutes and the aqueous phase drawn off, and finally the product was stripped from the toluene at 20 bar and 105° C.

450 g. of crude hydroxy nonyl acetophenone was recovered with the following composition:

| Component | Composition (weight %)* |
|---|---|
| Toluene | 0–1 |
| Nonylphenol | 3–6 |
| Nonyl Phenol Acetate | 5–10 |
| Hydroxy Nonyl Acetophenone | 68–74 |
| Alkylated Para Ketones | 2–4 |
| Ortho Hydroxy Acetophenone | 0.5–3 |
| Phenol | 0–0.3 |

*These ranges were obtained from the analysis of the products of several runs.

The product was then fractionated twice under vacuum in a packed column to take out lower and higher boiling impurities. A precut of 10–12% was taken at 6–8 mbar, a bottom temperature of about 175–180° C. and a reflux ratio between 2.5:1 and 5.0:1. In a second step a residue cut of 10 to 15% was taken at 1–3 mbar, 180–200° C. bottom temperature and a reflux ratio of 1.0:1 to 3.0:1.

360 g. of purified hydroxy nonyl acetophenone with the following composition was obtained.

| Component | Composition (weight %)* |
|---|---|
| Nonylphenol | 4–6 |
| Nonyl Phenol Acetate | 5–10 |
| Hydroxy Nonyl Acetophenone | 82–90 |
| Alkylated Para Ketones | 0 |
| Ortho Hydroxy Acetophenone | 0 |
| Phenol | 0 |

*These ranges were obtained from the analysis of the products obtained from several runs.

Comparative Example 1

438 g. of the same nonylphenol acetate used in Ex. 1, and 427 g. toluene were fed to a 1 l. stirred reactor, heated to reflux (115–120° C.) and dried by decantation of the water from the condensate. Then 199.4 g. granulated AlCl₃ was charged to the refluxing mixture over a period of 5 hours. The AlCl₃ addition was followed by a 1.5 hour reaction hold time at the same reaction temperature. At the end of the reaction hold time the product mixture was transferred to a second reactor filled with 855 g. water at ambient temperature and stirred for 15 minutes. The temperature rose to 70–80° C. The stirrer was stopped and after settling the water layer was drained off. A second wash (70–75 deg. C.) was made consisting of 21.38 g. of sodium carbonate in 833.62 g. of water (i.e. a 2.5% carbonate solution) was added, agitated for 15 minutes, settled for 15 minutes and the aqueous phase drawn off, and finally the product was stripped from the toluene at 20 mbar and 105° C.

407 g. of crude hydroxy nonyl acetophenone was recovered with the following composition:

| Component | Composition (weight %)* |
|---|---|
| Toluene | 0–1 |
| Nonylphenol | 8–12 |
| Nonyl Phenol Acetate | 10–15 |
| Hydroxy Nonyl Acetophenone | 60–65 |
| Alkylated Para Ketones | 2–4 |
| Ortho Hydroxy Acetophenone | 0.5–3 |
| Phenol | 0–1 |

*These ranges were obtained from the analysis of the products from several runs.

The product was then fractionated two times under vacuum in a packed column to remove lower and higher boiling impurities. A precut of 12–16% was taken at 6–8 mbar, a bottom temperature of about 175–180° C. and a reflux ratio between 2.5:1 and 5.0:1. In a second step a residue cut of 10 to 15% was taken at 1–3 mbar, 180–200° C. bottom temperature and a reflux ratio of 1.0 to 3.0:1.

315 g. of purified hydroxy nonyl acetophenone with the following composition was obtained.

| Component | Composition (weight %)* |
|---|---|
| Nonylphenol | 10–12 |
| Nonyl Phenol Acetate | 10–15 |
| Hydroxy Nonyl Acetophenone | 78–85 |
| Alkylated Para Ketones | 0 |
| Ortho Hydroxy Acetophenone | 0 |
| Phenol | 0 |

*These ranges were obtained from the analysis of the products from several runs.

Example 2

The purified hydroxy nonyl acetophone obtained in Example 1 was oximated to the ketoxime as follows:

360 g. of purified hydroxy nonyl acetophenone, 21.7 g. of water, 10.9 g. of ethyl hexanoic acid, 92.9 g. of sodium carbonate, and 124.7 g. of hydroxylamine sulfate were charged to a 1 l. stirred vessel and heated slowly to 70° C. (+/−5 deg. C.). After a reaction time of 4.5 hours the reaction was complete. After that 206 g. toluene were added for dilution and the product was then washed three times with water at 70° C. The second wash was carried out with a 1% sodium carbonate solution. Finally the toluene was stripped from the reaction mixture at 40 mbar and 110° C. 416 g. of concentrated oxime was obtained. The oxime contained less than 6% by weight of phenols.

Comparative Example 2

The purified hydroxy nonyl acetophenone obtained from the process of Comparative Example 1 was oximated to the ketoxime as follows:

322 g. of purified hydroxy nonyl acetophenone, 20 g. of water, 18.4 g. of water at ambient temperature, 9.2 g. of ethyl hexanoic acid, 78.2 g. of sodium carbonate and 105.7 g. of hydroxylamine sulfate were charged to a 1 l. stirred vessel and heated slowly to 70° C. (+/−5 deg. C.). After a reaction time of 4.5 hours the reaction was complete. After that 175 g. toluene were added for dilution and the product was then washed three times with water at 70° C. The second wash was carried out with a 1% sodium carbonate solution. Finally the toluene was stripped from the reaction mixture at 40 mbar and 100° C. 353 g. of concentrated oxime was obtained.

The oxime contained about 11 weight % of phenols.

Example 3

A solution of the ketoxime prepared by the process of Example 1 was dissolved in a commercially available hydrocarbon solvent ORFOM® SX-12. This solution was contacted for five minutes with an aqueous ammoniacal solution containing 15 gpl nickel as the sulfate salt, 1 gpl zinc as the sulfate salt, 32.5 gpl ammonia, and 25 gpl ammonium sulfate (O/A=1). The phases were then separated and the organic layer assayed for nickel content by AAS and for ammonia content using the procedure described in the Henkel Red Line Bulletin, "Determination of Ammonia in Solutions of LIX® Reagens". The results are set forth in the TABLE below.

Comparative Example 3

A solution of a commercial ketoxime (LIX® 84-I) which was prepared by the process of Comparative Example 1 was dissolved in ORFOM® SX-12 and the concentration adjusted to give an equivalent concentration of active extractant to that of Example 3 as measured by copper max load under the conditions of the Standard Henkel Quality Control Tests for Oxime Reagents. This solution was then used in the process of Example 3. The results are set forth in the TABLE below.

TABLE

| | EXAMPLE 3 KETOXIME | COMPARATIVE EXAMPLE 3 LIX 84-I ® KETOXIME |
|---|---|---|
| $[NH_3]_{1-Org}$ (gpl) | 0.601 | 0.725 |
| $[Ni]_{1-Org}$ (gpl) | 13.26 | 13.29 |

As can be seen from the above TABLE, the commercial ketoxime of the Comparative Example loads 20% more ammonia that does the ketoxime of Example 3 of the invention.

What is claimed is:

1. A process for the recovery of nickel from a nickel containing ore comprising:

(a) leaching the ore with an acid to provide an aqueous acid leach solution containing nickel values;

(b) adding a hydroxide to the aqueous acid leach solution to precipitate the nickel as nickel hydroxide;

(c) re-leaching the nickel hydroxide with an aqueous ammoniacal solution to provide an aqueous ammoniacal solution containing nickel values;

(d) contacting the aqueous ammoniacal solution containing the nickel values with a water insoluble oxime extractant capable of extracting nickel from said aqueous ammoniacal solution comprising at least one ketoxime of formula I.

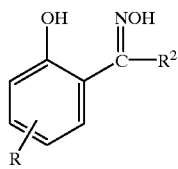

(1)

wherein R is an alkyl group having from 1 to 25 carbon atoms, an ethylenically unsaturated aliphatic group containing from 3 to 25 carbon atoms, or —$OR^1$ where $R^1$ is an alkyl group or ethylenically unsaturated aliphatic group as defined above; $R^2$ is an alkyl group containing 1 to 25 carbon atoms or an ethylenically unsaturated aliphatic group containing 3 to 25 carbon atoms; with the proviso that the total number of carbon atoms in the R and $R^2$ groups is from 3 to 25, wherein the at least one ketoxime contains less than 8% by weight of phenols, dissolved in a water-immiscible hydrocarbon solvent so as to provide an organic phase, for a time sufficient to extract the nickel values from said aqueous ammoniacal solution containing the nickel values thereby providing an aqueous phase of the ammoniacal solution from which nickel values have been removed and a water-immiscible organic phase, now containing the extracted nickel values;

(e) separating the aqueous and the organic phases;

(f) contacting the organic phase containing the nickel values with an aqueous acid solution thereby stripping the nickel values from the organic phase into the aqueous acid stripping solution;

(g) separating the aqueous acid stripping solution now containing the nickel values from the water-immiscible organic phase; and (h) electrowinning the nickel from the aqueous acid stripping solution to remove and recover the nickel.

2. The process of claim 1 wherein in step (d) said at least one ketoxime contains less than 6% phenols.

3. The process of claim 1 wherein the water insoluble oxime extractant in step (d) comprises A) at least one ketoxime selected from the group consisting of ketoximes of the formula:

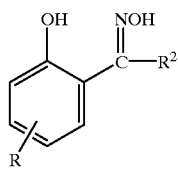

(1)

wherein R is an alkyl-group containing from 1 to 25 carbon atoms, an ethylenically unsaturated aliphatic group containing from 3 to 25 carbon atoms or —$OR^1$ where $R^1$ is an alkyl group or ethylenically unsaturated aliphatic group as defined above; and $R^2$ is an alkyl group containing from 1 to 25 carbon atoms with the proviso that the total number of carbon atoms in the R and $R^2$ group is from 3 to 25; and B) at least one aldoxime of formula XII below:

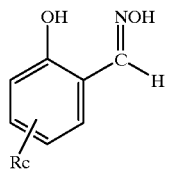

(XII)

in which R has the meaning given above, c has a value of 1, 2, 3, or 4, and the total number of carbon atoms in R is from 9 to 25; and wherein the ketoximes of component A) contain less than 8% by weight of phenols.

4. The process of claim 3 wherein the molar ratio of component A) to component B) is from about 1:100 to 100:1.

5. The process of claim 4 wherein said mole ratio is from about 1:4 to about 4:1.

6. The process of claim 3 wherein the ketoximes component A) contain less than 6% phenols.

7. The process of claim 1 wherein component A) is at least one ketoxime of formula I in which R is an alkyl group containing from 7 to 12 carbon atoms in a position para to the hydroxyl group, and $R^2$ is methyl.

8. The process of claim 3 wherein component B) is at least one compound of formula XII wherein $R_c$ is a single alkyl group containing from 7 to 12 carbon atoms and is present on the ring para to the hydroxyl group.

9. The process of claim 1 wherein following step (e) but prior to step (f) the organic phase is washed at least once with a weakly acidic aqueous solution.

10. The process of claim 1 wherein in step (d) the water insoluble oxime extractant also contains an ammonia antagonist having only hydrogen bond acceptor properties.

11. The process of claim 10 wherein said ammonia antagonist is an organic hydrogen bond acceptor compound having a water solubility of less than 100 ppm and containing organic functionalities of ester, ketone, sulfoxide, sulfone, ether, amine oxide, tertiary amide, phosphate, carbonate, carbamate, urea, phosphine oxide and nitrile and having greater than 8 carbon atoms, up to about 36 carbon atoms.

12. The process of claim 10 wherein said ammonia antagonist is selected from the group of alkyl esters and dialkyl ketones in which the alkyl groups contain from 4 to about 12 carbon atoms, and the dinitrile of a dimerized fatty acid.

13. The process of claim 10 wherein said ammonia antagonist is selected from the group consisting of 2,2,4-trimethylpentane-1, 3-diol diisobutyrate, isobutyl isooctanoate, isobutyl heptyl ketone and the dinitrile of a dimerized 18 carbon atom fatty acid.

14. The process of claim 10 wherein the ammonia antagonist is 2,2,4-trimethylpentane-1,3-diol diisobutyrate.

15. The process of claim 1 wherein in step (d) the water-immiscible hydrocarbon solvent is selected from the group consisting of kerosene, benzene, toluene and xylene.

16. The process of claim 1 wherein in step (a) the acid leach solution is a sulfuric acid solution.

17. The process of claim 1 wherein metal values co-extracted in the acid leach solution in step (a) which may interfere with the solvent extraction step (d) are removed prior to the re-leaching step (c) or in a bleed stream during the solvent extraction and stripping steps (d) and (f) prior to the electrowinning step (h).

18. The process of claim 1 wherein the hydroxide precipitation step (b) is carried out in two stages, the first stage being conducted at a pH of about 6 employing MgO and CaO, after which the solids are separated from the liquids followed by the second stage precipitation carried out at a pH of about 9.0 employing MgO after which the solids are again separated from the liquids.

19. The process of claim 1 wherein the aqueous ammoniacal re-leaching solution in step (c) is an aqueous ammoniacal carbonate solution.

20. The process of claim 1 wherein the aqueous ammoniacal re-leaching solution in step (c) is an aqueous ammoniacal sulfate solution.

21. The process of claim 1 wherein the extraction step (d) is carried out in three extraction stages E1 through E3 in a counter current flow from E3 to E1.

22. The process of claim 1 wherein the stripping step (f) is carried out in 4 strip stages S1 through S4 in a counter-current flow from S4 to S1.

23. The process of claim 22 wherein the stripping solution is a sulfuric acid solution.

24. The process of claim 22 wherein the four stripping stages are pH controlled in a gradient of from about 0.5 to about 4.0.

25. The process of claim 22 wherein the pH in stripping stage S4 is controlled at a pH of about 0.5–0.8; in S3 at a pH of about 0.9–1.0; in S2 at a pH of about 2.0 and in S1 at a pH of about 4.0; to provide an electrolyte of a pH of 3–4 prior to electrowinning step (h).

* * * * *